April 8, 1958 A. W. PAZAN 2,829,699
APPARATUS FOR APPLYING REINFORCING FIBROUS
MATERIAL TO A PLASTIC PIPE
Filed Oct. 8, 1954 2 Sheets-Sheet 2

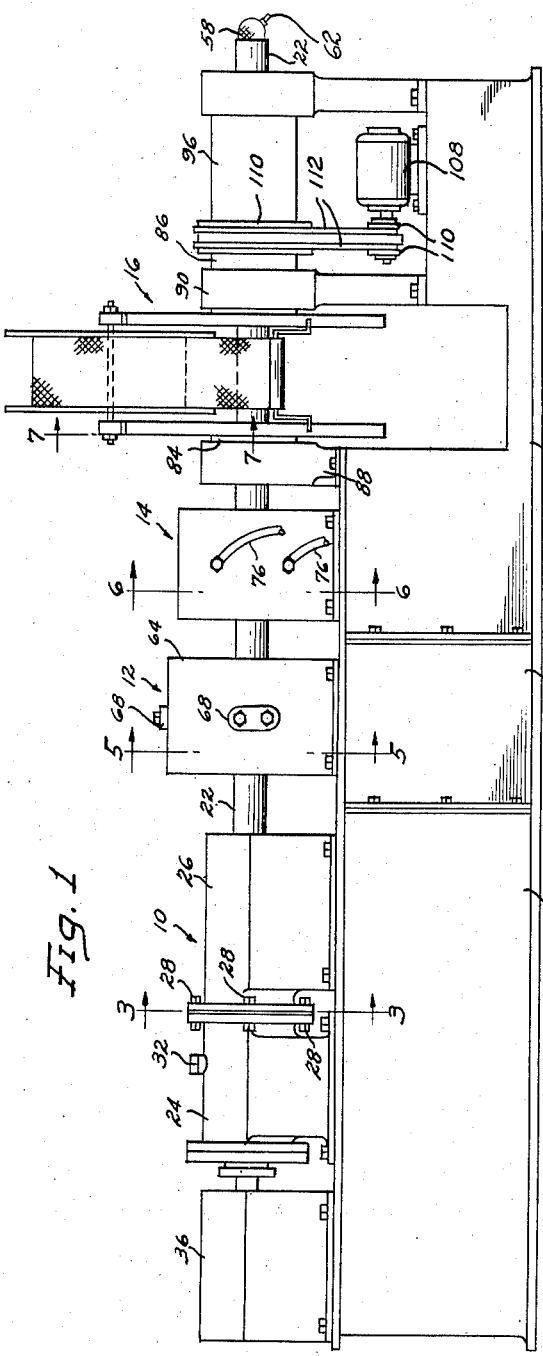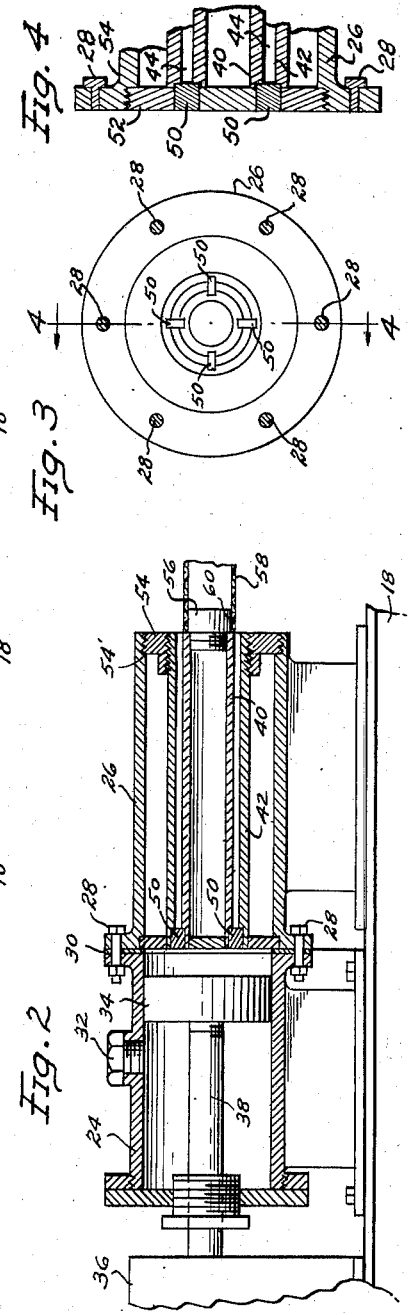

INVENTOR.
ARTHUR W. PAZAN.
BY
Wallace P. Lamb
ATTORNEY.

United States Patent Office 2,829,699
Patented Apr. 8, 1958

2,829,699

APPARATUS FOR APPLYING REINFORCING FIBROUS MATERIAL TO A PLASTIC PIPE

Arthur W. Pazan, Detroit, Mich.

Application October 8, 1954, Serial No. 461,260

1 Claim. (Cl. 154—1.7)

This invention relates generally to a method of and apparatus for manufacturing pipe and particularly to a method of and apparatus for manufacturing reinforced plastic pipe.

The advantages of plastic as a structural material have long been appreciated because of the many desirable characteristics inherent therein and not in metal or other material. For example, as is well known, plastics are more suitable for use in damp localities than most materials since plastic will not corrode or rot. Also, plastic material, if properly reinforced, is not easily broken, is light in weight to mention only a few of its advantages over metal and other material. The problem of using plastics in manufacturing certain articles or products has been chiefly concerned with methods and apparatus for making strong products economically.

According to my invention, I provide a method and apparatus for making reinforced plastic pipe economically in view of its wide utility and desirable characteristics. In general, my method and apparatus provide for the extrusion of a resin pipe-like core which is then cured; has a coating of resin applied thereto; then has a layer of reinforcing fibers wound thereon and pressed into the resin coating and the alternate application of resin coatings and reinforcing fiber repeated to the desired number for required pipe strength.

The principle object of my invention is to make available the many desirable characteristics of plastic in the form of tubular products, such as pipe.

Another object of my invention is to provide a method and apparatus for making reinforced plastic pipe economically.

Another object of my invention resides in the method and apparatus which I provide to apply reinforcing fibrous material to the plastic pipe.

Another object of my invention resides in a novel apparatus and arrangement for applying a coating of resin to the pipe under manufacture.

Another object of the invention is to provide in connection with a plastic pipe, extruding apparatus for extruding plastic pipe without the occurrance of any appreciable shrinkage thereof.

Other objects of the invention will become apparent from the following detail description taken with the accompanying drawings in which:

Fig. 1 is a side view of my apparatus for manufacturing reinforced plastic pipe;

Fig. 2 is a cross sectional view of a plastic extruding cylinder, taken along line 2—2 of Fig. 1;

Fig. 3 is a cross sectional view of a plastic setting or curing oven, taken along line 3—3 of Fig. 1;

Fig. 4 is a detail sectional view, taken along line 4—4 of Fig. 1;

Figure 9:
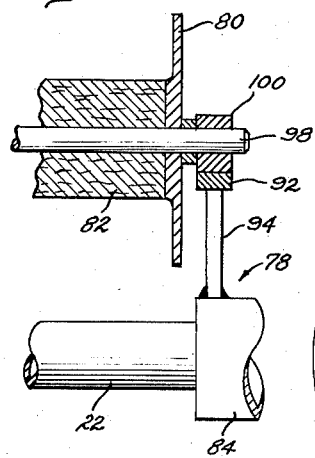
Fig. 9 is an enlarged fragmentary sectional view of the apparatus of Fig. 1.

Referring to the drawings by characters of reference and particularly to Fig. 1, my reinforced plastic pipe making apparatus includes a pipe core extruder 10, a heater 12, a liquid resin applicator 14, and a fibrous material applicator 16. These devices are arranged in horizontal alignment in the order named and may be suitably mounted on bases 18. The extruder 10 extrudes a pipe-like resin core 22 which passes through heater 12 to the resin applicator 14 where a coating of liquid resin is applied to the outer surface thereof and then passes to the applicator 16 where a coating of fibrous material is applied to the coating of resin to strengthen the pipe. As the core 22 emerges from the extruder 12, a catalyst, such as peroxide is applied thereto to effect the so-called curing or setting of the resin when subjected to the heat of heater 12. In the manufacture of reinforced plastic pipe any suitable plastic and fibrous materials may be used, but I prefer to use a polyester plastic and a fiber glass reinforcement therefor as I believe these make up a stronger pipe with less laminations of resin and fiber.

The extruder 10 comprises a resin discharge cylinder 24 and an extruding die 26. These units are arranged such that their longitudinal axes are horizontally disposed in alignment and may have adjacent ends flanged and secured together by bolts 28. A metal sealing ring or gasket 30 is preferably provided between the cylinder flanges to insure a leak-proof joint therebetween. The cylinder 24 has a filler for liquid resin which may be closed by a threaded plug 32. A piston 34 in cylinder 24 displaces liquid resin into the extruding die 26 and may be operated by a hydraulic ram 36, connected to piston 34 by a connecting rod 38.

Referring now to Figs. 2 to 4 the extruding die shown comprises a pair of die members including an inner tubular die member 40 and an outer tubular die member 42. These die members are concentrically arranged having an annular space 44 therebetween which determines the wall thickness of the extruded resin pipe core 22. The end of the inner die member 40, at the inlet to the die is closed and this end is supported relative to the outer end by keys 50 which connect the inner and outer die members together. The outer die member 42 is rigidly secured at the die inlet end to the extruding cylinder casing by a flange 52. This flange may be formed integral with the outer die member 42 and extending outwardly therefrom may screwthread into the cylinder which may be recessed, as at 54', to provide a seat for the flange. At its outlet end, the die cylinder has an end plate 54 which may be externally threaded to screwthread into the cylinder and seat against an annular shoulder 56 therein. The plate 54 is provided with an inwardly extending hollow boss which is internally threaded to screwthread onto the outer die member 42 to support the end thereof. Closing the outer end of the inner die member 40 is a plug 56 which may be screwthreaded thereinto, as shown.

In order to insure against undue shrinkage of the extruded pipe core 22, I provide an inflatable member 58 arranged such that the extruded core 22 must pass thereover, and inflated to bring equal pressure to bear against the inner surface of the core 22 thus opposing shrinkage thereof. As shown, the inflatable member 58 may extend through the heater 12, resin applicator 14 and the fiber glass applicator 16 to insure against shrinkage of the pipe throughout the various steps of its manufacture. The inflatable member may be made of any suitable material such as a strong fabric and the end thereof adjacent the die 26 may be fitted with a metal or plastic ferrule 60 for securing the inflatable member to the die. The other end of the inflatable member 58 is provided with a filler and pressure actuated valve 62 to fill the inflatable to the desired pressure and hold the pressure. If desired, instead of using the inflatable member 58, a mixture of small pieces of fiber glass and polyester resin may be used to extrude the pipe core 22 as the presence of the fiber glass materially reduces shrinkage of the core.

The extruded pipe core 22 passes from the extruding die 26 into the heater 12 which, in the present apparatus, is illustrated as a housing or oven 64 in which is mounted radially about pipe 22, a plurality of infra-ray lamps 66 to set or cure the resin. It will be appreciated that, hot air circulated through housing or any other suitable heating means may be employed to set or cure the resin of pipe core 22. Suitable mountings, including clamps 68 may be used to mount the lamps 66 on the housing 64, or the lamps may be mounted thereon in any other suitable manner.

From the heater 12, the core passes into the resin applicator 14 wherein the first resin coating is applied to the core 22 to build up a strong laminated pipe wall structure. The resin applicator 14 includes a housing 70 wherein a plurality of resin spray nozzles 72 are mounted. As shown, the present arrangement comprises four nozzles radially spaced about the longitudinal axis of the core 22 so as to completely cover the core with a coating of resin as the core moves through the housing 70. The nozzles 72 are connected by suitable conduits 76 to a compressor (not shown).

In accordance with one feature of my invention, I provide for applying a layer of reinforcing fibrous material, such as, fiber to the freshly, resin coated core 22 by means of an arm or wheel 78 which carries a reel 80 having a spool of fiber cloth 82 which winds onto the longitudinally moving core 22. The wheel 78 has axially aligned tubular shafts 84 and 86 which are spaced apart and are respectively journaled in spaced standards 88 and 90 respectively. The tubular shafts 84, 86 are coaxial with the core 22 which passes therethrough. The wheel 78 may comprise a pair of rims 92 connected by spokes 94 respectively to the shafts 84, 86 such as by welding. The core 22, advanced by reason of the ram 36, moves longitudinally through the hollow shafts 84, 86 and when passing between the standards 88, 90 has a layer of fiber glass 96 wound thereon from the reel 80.

Figure 7:
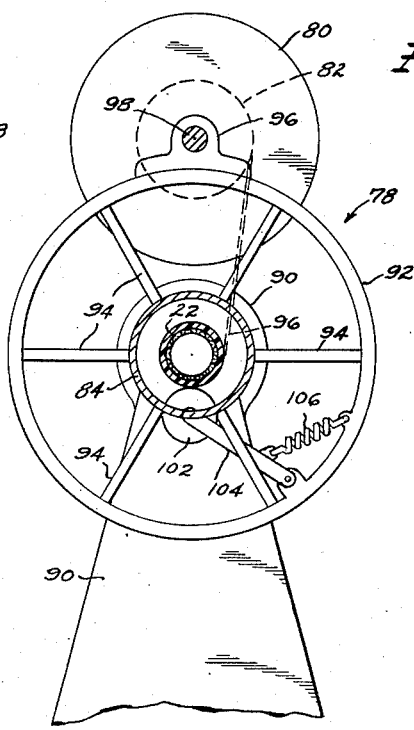
Fig. 7 is a cross sectional view taken along line 7—7 of Fig. 5.
Figure 8:
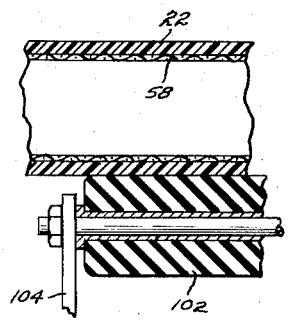
Fig. 8 is a sectional view taken along line 8—8 of Fig. 1.
Figure 5:
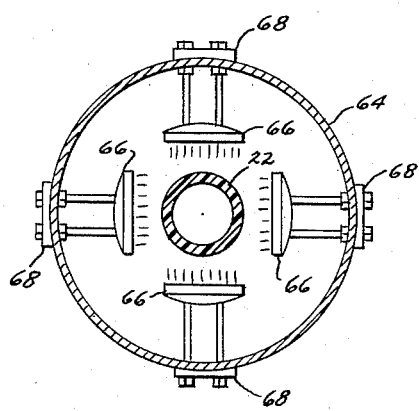
Fig. 5 is an enlarged fragmentary sectional view of one end of an extruding die, taken along line 5—5 of Fig. 1.
Figure 6:
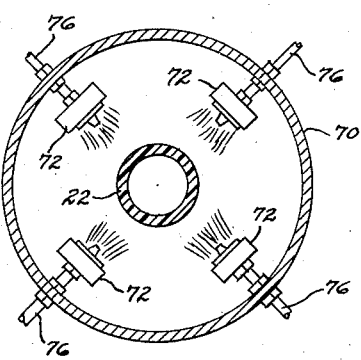
Fig. 6 is an enlarged fragmentary sectional view of the other end of the extrusion die.

With reference particularly to Figs. 7 and 8 of the drawings, it will be seen that the reel 80 has a shaft 98 which is journaled in bearings 100 which are aligned and respectively secured to the wheel rims 92 on the peripheries thereof, and that the reel 80 extends between and connects the rims together. This is the only connection between the wheels or between the rotatable shafts 84, 86. Carried by and extending between the wheels is a pressure roller 102 which is mounted on the wheels by pivoted arms 104 and a coil spring 106 is connected between the wheel rims and arms 104 to urge the roller 102 resiliently toward the pipe core 22 to press the fiber glass into the coating of resin.

An electric motor 108 is provided to drive shaft 86 through pulleys 110 and multiple V-belts 112. While I have herein referred to the fiber glass applicator 16 as having a wheel or wheels carrying the reel 80, said wheel or wheels is, or are of course, basically an arm moving through a rotary path such that the fiber glass material is unwound from the reel onto the pipe core 22. Also, it will be understood that additional resin applicators 12, heaters 14 and fiber glass applicators 16 may be provided and arranged to apply as many laminations to the making of the pipe as may be desired.

In operation, the ram 36 moves piston 34 inwardly, forcing the resin from the reservoir or piston cylinder 24 into and through the extruding device 26 wherein the spaced coaxially arranged dies 40, 42 cause the resin to be extruded in the pipe-like form of core 22. This extrusion 22 is referred to as a core because in my method said core is the base which gives shape to the pipe during application of laminations of resin and fiber glass thereto. The core 22 is forced by the ram 36 out of the extruding die and is moved by the ram along a path of travel during which the core is sprayed with a catalyst, such as peroxide, after each application of resin which together with heater 12 effect a setting or curing of the resin. The core continues through the heater 12 and then into the resin applicator 14 wherein the nozzles 72 spray a coating of liquid resin onto the outer surface of the core 22 as the core passes lengthwise through the spray housing. Next, the freshly resin coated core 22 passes to the fiber glass applicator 16 where the fiber glass containing reel 80 travels about the core winding the fiber glass thereonto which at the same time is being pressed into the coating of resin on the core by the roller 102. Motor 108 drives the fiber glass applicator through the pulley and belt drive connections and through reel 80 which connects the wheel rims 72 together.

While I have shown and described my invention in detail with reference to method and apparatus for making reinforced plastic pipe, it will be understood that many variations and modifications may be made without deviating from the invention, and that the invention is to be limited only by the spirit and scope of the appended claim.

I claim:

In an apparatus in which the force of the ejection molding of a tubular core is utilized to move the core longitudinally along a path of travel, a machine for supporting the core and wrapping a reinforcing material thereabout comprising, supports spaced longitudinally along the path of travel having openings through which the core passes, an open-ended hollow shaft rotatably mounted in one of said supports, a second open-ended hollow shaft rotatably mounted in the other of said supports, said shafts in axial alignment to receive the core and having spaced apart opposed ends between which the core is exposed, a pair of rims respectively carried by said rotatable shafts and extending radially therefrom, a reel of fibrous reinforcing material carried by and between said rims to wrap onto the core as the core passes between the hollow shafts, and drive means rotating said hollow shafts to revolve the reel about the axis of said shafts, and a roller carried by and between said arms to roll the reinforcing material against the core, said roller, reel and shafts having their axes parallel.

References Cited in the file of this patent

UNITED STATES PATENTS

| | | |
|---|---|---|
| 2,280,252 | Muehleck | Apr. 21, 1942 |
| 2,389,725 | Gillis et al. | Nov. 27, 1945 |
| 2,422,234 | Goldman | June 17, 1947 |
| 2,471,580 | Perrault et al. | May 31, 1949 |
| 2,502,638 | Becht | Apr. 4, 1950 |
| 2,539,853 | Meyers et al. | Jan. 30, 1951 |
| 2,558,855 | Knewstubb et al. | July 3, 1951 |
| 2,583,819 | Cummings | Jan. 29, 1952 |
| 2,656,873 | Stephens | Oct. 27, 1953 |
| 2,694,661 | Meyer | Nov. 16, 1954 |